United States Patent [19]

Aramaki et al.

[11] Patent Number: 4,559,433
[45] Date of Patent: Dec. 17, 1985

[54] WIRE CUT ELECTRICAL DISCHARGE MACHINING APPARATUS WITH ELECTRIC FEEDERS IN A TUBULAR GUIDE

[75] Inventors: Jun Aramaki; Masaru Shinkai, both of Aichi, Japan

[73] Assignee: Mitsubishi Denki Kabushiki Kaisha, Tokyo, Japan

[21] Appl. No.: 588,863

[22] PCT Filed: May 25, 1983

[86] PCT No.: PCT/JP83/00157

§ 371 Date: Jan. 25, 1984

§ 102(e) Date: Jan. 25, 1984

[87] PCT Pub. No.: WO83/04205

PCT Pub. Date: Dec. 8, 1983

[30] Foreign Application Priority Data

May 25, 1982 [JP] Japan .................................. 57-88305

[51] Int. Cl.$^4$ ................................................ B23P 1/08
[52] U.S. Cl. ................................................ 219/69 W
[58] Field of Search ............... 219/69 W, 69 E, 69 M; 15/316 R, 317; 226/91

[56] References Cited

U.S. PATENT DOCUMENTS 4,205,212 5/1980 Ullmann et al. ................. 219/69 W
4,239,952 12/1980 Rhyner ............................ 219/69 W
4,367,392 1/1983 Girardin ......................... 219/69 W
4,379,959 4/1983 Inoue ............................. 219/69 M
4,383,161 5/1983 Corcelle ......................... 219/69 W
4,495,393 1/1985 Janicke .......................... 219/69 W

FOREIGN PATENT DOCUMENTS 54-17597  2/1979 Japan .
164438 12/1980 Japan ............................ 219/69 W
56-76334  6/1981 Japan ............................ 219/69 W
56-76340  6/1981 Japan ............................ 219/69 W
56-82133  7/1981 Japan .
102432  8/1981 Japan ............................ 219/69 W

*Primary Examiner*—C. L. Albritton
*Assistant Examiner*—Geoffrey S. Evans
*Attorney, Agent, or Firm*—Sughrue, Mion, Zinn, Macpeak & Seas

[57] ABSTRACT

In a wire cut electrical discharge machining apparatus having an automatic wire feeder which feeds an electrode wire 10 through the material 12 to be machined automatically, electricity feeders 70 for supplying electrical energy for the machining operation to the wire 10 are disposed within a tubular guide 64 through which the wire 10 extends. The tubular guide 64 is improved in rigidity, and improved reliability is achieved in the supply of electricity to the wire.

11 Claims, 5 Drawing Figures

WIRE CUT ELECTRICAL DISCHARGE MACHINING APPARATUS WITH ELECTRIC FEEDERS IN A TUBULAR GUIDE

TECHNICAL FIELD

This invention relates to a wire cut electrical discharge machining apparatus. More particularly, it provides an improved wire cut electrical discharge machining apparatus including a tubular guide for guiding an electrode wire in a machining area in which the wire faces the material to be machined, and in its vicinity.

BACKGROUND ART

There is known a wire cut electrical discharge machining apparatus which includes a device for feeding an electrode wire automatically through the material to be machined.

FIG. 1 is a schematic illustration of the conventional apparatus in its operating position. An electrode wire 10 is supplied from a wire supply reel not shown to the material 12 to be machined. The material 12 has an initial hole 14 through which the wire 10 extends. The material 12 to be machined is moved in the X and Y directions relative to the wire 10 by a driving device not shown. The material 12 is machined during its movement relative to the wire 10. The wire 10 extends through a tubular guide 16 provided at its lower end with a guide die 18 for guiding the electrode wire 10 in the machining area. Another guide die 20 is provided on the top of a lower guide 22 for guiding the wire 10 below the material 12. A plurality of electricity feeders 24 are located in contact with the wire 10 to supply electrical energy for the machining operation from a power source 26 to the wire 10. The tubular guide 16 has a corresponding number of openings 28 in each of which one of the feeders 24 is located. Another electricity feeder 30 is provided in the lower guide 22 for supplying electrical energy from the power source 26 to the wire 10 below the material 12 to be machined. A pair of nozzles 32 and 34 are provided above and below the material 12 for jetting a working fluid 36 into the electrical discharge machining area between the wire 10 and the material 12 to be machined. A bearing 38 is provided in the upper nozzle 32 for supporting the tubular guide 16. Each of the nozzles 32 and 34 has an inlet 40 or 42 for the working fluid 36. A pair of pinch rollers 44 are provided at the top of the tubular guide 16 for feeding the wire 10 to the lower guide 22 through the tubular guide 16. The pinch rollers 44 are driven by a drive motor not shown to move the wire 10 down. The tubular guide 16 is vertically movable along a guide bar 52 by a motor 46, a feed screw 48 and a slider 50. The motor 46, feed screw 48, slider 50 and guide bar 52 define a vertical drive system 80 for the tubular guide 16. The vertical movement of the tubular guide 16 facilitates the insertion of the wire 10 into the lower guide 22. A cutter 54 is provided for cutting the wire 10 after the tubular guide 16 has been raised by the motor 46 to a position above the cutter 54. A pair of rollers 56 are provided for pulling the wire 10 down through the lower guide 22. The wire 10 is fed out of the apparatus by a pair of rollers 60 provided with a belt 58, and a motor 62 connected to the rollers 60.

FIG. 2 shows the position of the apparatus shown in FIG. 1 in which the electrode wire 10 is fed to the lower guide 22. The tubular guide 16 is lowered by the drive motor 46 to the lower guide 22 through the initial hole 14 of the material 12 to be machined. The electricity feeders 24 are moved away in the directions of arrows in FIG. 2 by a drive unit not shown in order to enable the downward movement of the tubular guide 16.

FIG. 3 shows the position of the apparatus shown in FIG. 1 in which the wire 10 is cut. The tubular guide 16 is raised by the vertical drive system 80 to a position above the cutter 54, and the cutter 54 is moved in the directions of arrows in FIG. 3 by a drive unit not shown to cut the wire 10. The cutting of the wire 10 also requires the movement of the feeders 24 away from the tubular guide 16 as shown by arrows.

The wire cut electrical discharge machining apparatus constructed as shown in FIG. 1, and adapted for operation as hereinabove described with reference to FIGS. 2 and 3 has a number of disadvantages. It is necessary to move the electricity feeders 24 away from each other to enable the vertical movement of the tubular guide 16, and toward each other to supply electricity to the wire 10 when the material 12 to be machined is machined. A separate mechanism is required for moving the feeders 24, and fine control is required for bringing the feeders 24 into proper contact with the wire 10. The strength of the tubular guide 16 is reduced by the presence of the openings 28 provided for enabling the supply of electricity from the exterior of the guide 16 to the wire 10. When the apparatus is set for the machining operation, it is impossible to move the tubular guide 16 vertically to its optimum position suited for any possible variation in the thickness of the material 12 to be machined, since the feeders 24 are not vertically movable.

DISCLOSURE OF THE INVENTION

Under these circumstances, this invention provides a wire cut electrical discharge machining apparatus having electricity feeders for an electrode wire disposed in a tubular guide through which the wire extends. The feeders are vertically movable with the tubular guide, and no mechanism is required for moving the feeders to or away from the tubular guide. The tubular guide is improved in rigidity. Improved reliability is obtained in the supply of electricity to the wire. The vertical position of the tubular guide is adjustable to suit variation in the thickness of the material to be machined.

BEST MODE OF CARRYING OUT THE INVENTION

A preferred embodiment of this invention will now be described with reference to the drawings.

Figure 1:
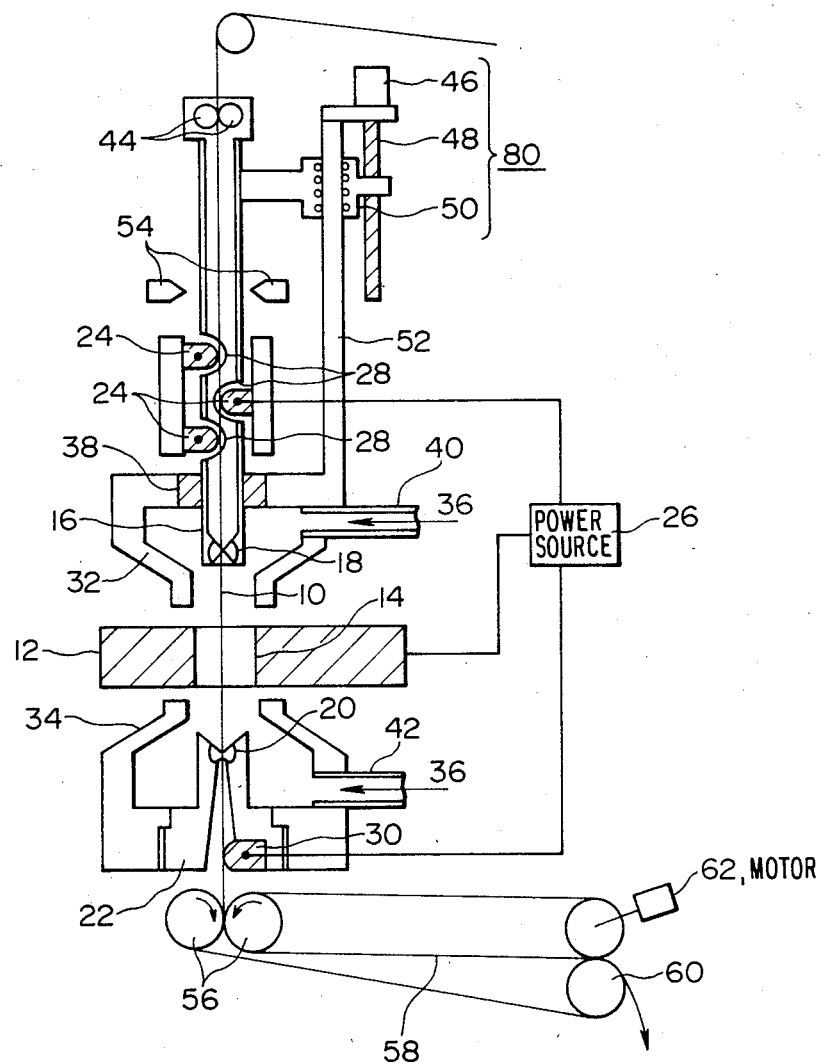
FIG. 1 is a schematic illustration of a wire cut electrical discharge machining apparatus including a conventional automatic wire feeder having a tubular guide.
Figure 4:
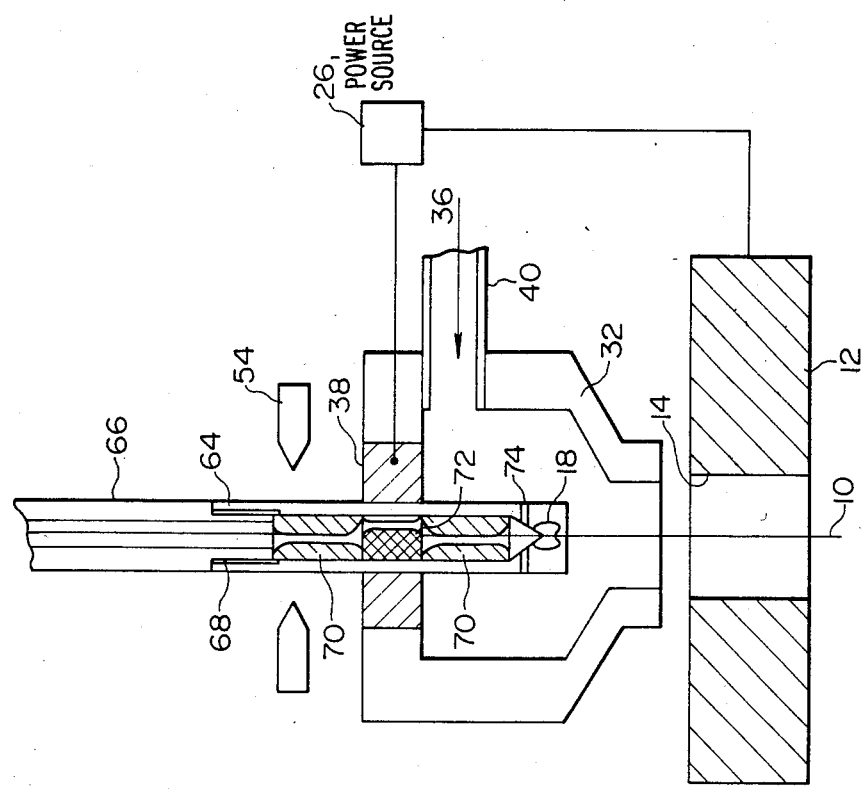
FIG. 4 is a longitudinal sectional view showing a tubular guide embodying this invention.
Figure 3:
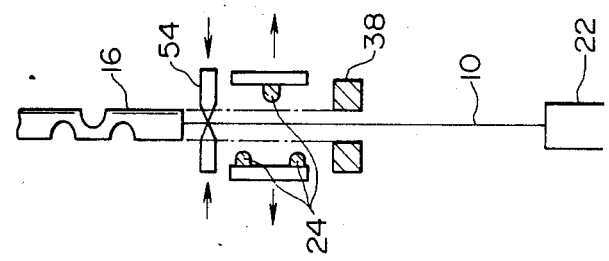
FIG. 3 is a schematic illustration showing the tubular guide set for enabling the electrode wire to be cut in the apparatus shown in FIG. 1.
Figure 2:
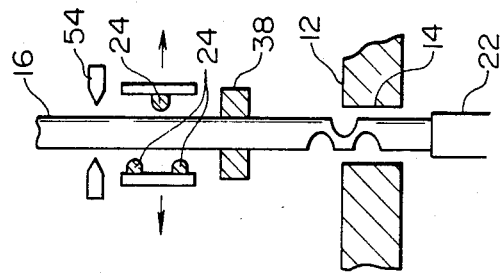
FIG. 2 is a schematic illustration showing the tubular guide set for feeding an electrode wire in the apparatus shown in FIG. 1.
Figure 5:
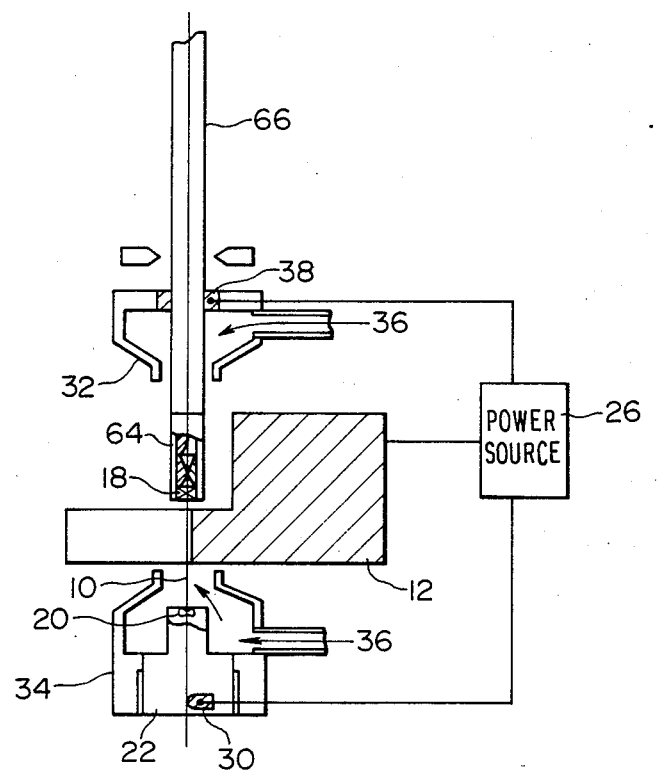
FIG. 5 is a schematic illustration showing an example of operation which is possible by this invention.

Referring to FIG. 4, there are shown a tubular guide and its vicinity in a wire cut electrical discharge machining apparatus embodying this invention. FIG. 4 shows only the tubular guide and its vicinity, and the rest of the apparatus is equal to what is shown in FIG. 1. FIG. 5 shows an example of operation which is possible by the apparatus of this invention. Like numerals are used to indicate like parts throughout FIGS. 1 to 5 so that no repeated description may be required.

Referring to FIG. 4, there are shown a tubular guide 64 for an electrode wire 10, and a pipe 66 connected to the guide 64 threadedly at 68, and preferably made of an insulating material. The pipe 66 is supported on the slider 50 in the vertical drive system 80. A pair of electricity feeders 70 are disposed in the tubular guide 64 and have an axial hole for the wire. The wire is held by a wire holder 72. The tubular guide 64 has an inlet 74 for a working fluid 36 which is introduced to cool the wire 10.

In the apparatus shown in FIG. 4, electricity is supplied from the power source to the electrode wire 10 above the material 12 to be machined through the bearing 38, the tubular guide 64 and the feeders 70. The wire holder 72 urges the wire 10 away from the center of the tubular guide 64 to bring it into contact with the peripheral wall of the hole in the feeders 70 so that electricity may be supplied to the wire 10 by the feeders 70. The feeders 70 and the wire holder 72 are easily removable for replacement if the pipe 66 is disconnected from the tubular guide 64 at 68. The working fluid 36 introduced through the inlet 40 on the upper nozzle 32 flows into the tubular guide 64 through the inlet 74 situated above the upper guide die 18, and goes up through the wire holes in the feeders 70 and the wire holder 72 to cool the wire 10 in the area in which electricity is supplied to it.

Referring to FIG. 5, there is shown an example of operation which is possible by the apparatus of this invention. The material 12 to be machined has a varying thickness. The tubular guide 64 is vertically moved in accordance with the thickness of the material 12 to be machined. It can be lowered to a level close to the upper surface of the material 12 to be machined; therefore, a minimum distance can be maintained between the guide dies 18 and 20 which guide the wire 10 in the machining area. It is, therefore, possible to minimize the vibration of the wire 10 during the machining operation and thereby achieve a higher degree of machining accuracy.

The embodiment of this invention as hereinabove described relates to a wire cut electrical discharge machining apparatus including an automatic wire feeder having a vertically movable tubular guide 64, and provides an improvement in the tubular guide 64 and the system for supplying electricity to the wire. This invention is also applicable to an ordinary wire cut electrical discharge machining apparatus having a stationary tubular guide to eliminate the necessity for any mechanism for moving the electricity feeders to and away from the tubular guide, improve the rigidity of the tubular guide and increase the reliability with which electricity is supplied to the wire.

The location of the electricity feeders in the tubular guide eliminates the necessity for the provision of the openings in the tubular guide for the supply of electricity to the wire and the mechanism for moving the feeders to enable the vertical movement of the tubular guide. This feature simplifies the construction of the apparatus, and ensures the improved reliability in the supply of electricity to the wire and thereby in the machining operation. Moreover, the tubular guide can be set at an optimum level of height depending on the variation in the thickness of the material to be machined to prevent the vibration of the electrode wire and thereby achieve a high degree of machining accuracy.

We claim:

1. A wire cut electrical discharge machining apparatus comprising a tubular guide through which an electrode wire supplied from a wire supply reel extends, a system for moving said tubular guide vertically relative to an initial hole in the conductive material to be machined, an upper guide die provided at the lower end of said tubular guide for supporting said wire, a lower guide facing said upper guide die and provided below said conductive material for guiding said wire, a wire cutter operable to cut said wire when said tubular guide is raised to a cutting position, and a plurality of feeders disposed in said tubular guide for supplying electricity to said wire.

2. An apparatus as set forth in claim 1, further including a wire holder provided in said tubular guide and having an axial hole extending eccentrically relative to the longitudinal axis of said tubular guide to hold said wire in contact with said feeders.

3. An apparatus as set forth in claim 2, further including a pipe connected to said tubular guide and supported on said vertically moving system, said wire extending through said pipe.

4. An apparatus as set forth in claim 3, wherein said pipe is threadedly connected to said tubular guide.

5. An apparatus as set forth in claim 4, wherein said pipe is made of an insulating material.

6. An apparatus as set forth in claim 3, further including a stationary upper nozzle through which said tubular guide is movable to reach said initial hole in said material.

7. An apparatus as set forth in claim 6, further including a bearing provided in said upper nozzle for guiding said tubular guide.

8. An apparatus as set forth in claim 7, wherein electricity is supplied from a power source to said feeders through said bearing and said tubular guide.

9. An apparatus as set forth in claim 8, wherein said tubular guide has an inlet for a working fluid provided above said upper guide die.

10. An apparatus as set forth in claim 9, wherein said working fluid is supplied through said upper nozzle and said inlet into an axial bore in said tubular guide through which said wire extends.

11. A wire cut electrical discharge machining apparatus comprising a tubular guide having an axial bore through which an electrode wire supplied from a wire supply reel extends, said tubular guide being provided in its sidewall with an inlet for a working fluid leading to said axial bore, an insulating pipe which is threadedly connected to said tubular guide, and through which said wire extends, a system connected to said pipe for moving said tubular guide vertically relative to an initial hole in the conductive material to be machined, an upper guide die provided at the lower end of said tubular guide below said inlet for supporting said wire, a lower guide facing said upper guide die and provided below said conductive material for guiding said wire, a wire cutter operable to cut said wire when said tubular guide is raised to a cutting position, a plurality of feeders disposed in said tubular guide for supplying electricity to said wire, a wire holder provided in said tubular guide and having an axial hole extending eccentrically relative to said axial bore of said tubular guide to hold said wire in contact with said feeders, and an upper nozzle having a bearing by which said tubular guide is guided when it is vertically moved through said nozzle.

* * * * *